United States Patent
Yang et al.

(10) Patent No.: US 10,015,778 B2
(45) Date of Patent: Jul. 3, 2018

(54) SYSTEMS AND METHODS FOR UPLINK CONTROL INFORMATION SIGNALING DESIGN

(71) Applicant: Telefonaktiebolaget LM Ericsson (publ), Stockholm (SE)

(72) Inventors: Yu Yang, Solna (SE); Daniel Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 15/070,473

(22) Filed: Mar. 15, 2016

(65) Prior Publication Data
US 2016/0278074 A1 Sep. 22, 2016

Related U.S. Application Data

(60) Provisional application No. 62/134,276, filed on Mar. 17, 2015.

(51) Int. Cl.
| | |
|---|---|
| H04W 72/04 | (2009.01) |
| H04L 27/00 | (2006.01) |
| H04L 5/00 | (2006.01) |
| H04L 1/18 | (2006.01) |
| H04W 16/14 | (2009.01) |

(52) U.S. Cl.
CPC ....... H04W 72/0413 (2013.01); H04L 1/1812 (2013.01); H04L 5/0055 (2013.01); H04L 27/0006 (2013.01); H04W 16/14 (2013.01); H04W 72/0453 (2013.01)

(58) Field of Classification Search
CPC ............. H04W 72/0413; H04W 16/14; H04W 72/0453; H04L 1/1812; H04L 5/005; H04L 27/0006
See application file for complete search history.

(56) References Cited

U.S. PATENT DOCUMENTS

| | | | |
|---|---|---|---|
| 2012/0106471 A1* | 5/2012 | Behravan | H04L 5/005 370/329 |
| 2014/0036889 A1 | 2/2014 | Kim et al. | |
| 2016/0192396 A1* | 6/2016 | Ng | H04W 74/0808 370/329 |
| 2016/0212649 A1* | 7/2016 | Chen | H04W 24/10 |
| 2017/0013565 A1* | 1/2017 | Pelletier | H04W 52/146 |

OTHER PUBLICATIONS

Intl. Appln. PCT/IB2016/051486, PCT Notification of Transmittal of the International Search Report and the Written Opinion of the International Searching Authority, or the Declaration, dated Aug. 16, 2016.
S. Huawei, "Analysis on the Support of UL Transmission for LAA," 3GPP TSG RAN WGI Meeting #80, Athens, Greece, Feb. 9-13, 2015, R1-150048.

* cited by examiner

*Primary Examiner* — Duc C Ho
(74) *Attorney, Agent, or Firm* — Baker Botts, LLP

(57) ABSTRACT

According to certain embodiments, a method by a wireless device is provided for transmitting uplink control information (UCI) on a serving cell on the unlicensed spectrum. The method includes formatting the UCI as a shortened control signalling transmission and transmitting the UCI formatted as the shortened control signalling transmission to a network node. The shortened control signalling transmission is transmitted during a transmission opportunity on the serving cell on the unlicensed spectrum without performing channel sensing.

24 Claims, 21 Drawing Sheets

SYSTEMS AND METHODS FOR UPLINK CONTROL INFORMATION SIGNALING DESIGN

PRIORITY

This application claims priority to U.S. Patent Provisional Application No. 62/134,276 filed on Mar. 17, 2015, entitled "Methods of UCI Design in LAA," the disclosure of which is hereby incorporated by reference.

TECHNICAL FIELD

The present disclosure relates, in general, to wireless communications and, more particularly, systems and methods for systems and methods for uplink control information (UCI) signaling design for operation on the unlicensed spectrum.

BACKGROUND

The 3GPP Rel-13 feature "Licensed-Assisted Access" (LAA) allows LTE equipment to also operate in the unlicensed 5 GHz radio spectrum. The unlicensed 5 GHz spectrum is used as a complement to the licensed spectrum. Accordingly, devices (i.e., LTE user equipment (UEs)) connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard, also known under its marketing brand as "Wi-Fi."

In Europe, the LBT procedure is under the scope of EN 301.893 regulation. For LAA to operate in the 5 GHz spectrum the LAA LBT procedure shall conform to requirements and minimum behaviors set forth in EN 301.893. However, additional system designs and steps are needed to ensure coexistence of Wi-Fi and LAA with EN 301.893 LBT procedures.

As an example, U.S. Pat. No. 8,774,209 B2, "Apparatus and method for spectrum sharing using listen-before-talk with quiet periods," discusses where LBT is adopted by frame-based OFDM systems to determine whether the channel is free prior to transmission. A maximum transmission duration timer is used to limit the duration of a transmission burst, and is followed by a quiet period. In contrast, this invention focuses only on the LBT phase of a load-based OFDM system, and is designed to ensure fairer coexistence with other radio access technologies such as Wi-Fi while also satisfying EN 301.893 regulations.

Long Term Evolution (LTE)

FIG. 1 illustrates the basic LTE downlink physical resource. LTE uses Orthogonal Frequency Division Multiplexing (OFDM) in the downlink and Discrete Fourier Transform (DFT)-spread OFDM (also referred to as single-carrier FDMA (SC-FDMA)) in the uplink. The basic LTE downlink physical resource can thus be seen as a time-frequency grid, where each resource element corresponds to one OFDM subcarrier during one OFDM symbol interval. The uplink subframe has the same subcarrier spacing as the downlink, and the same number of SC-FDMA symbols in the time domain as OFDM symbols in the downlink.

FIG. 2 illustrates the LTE time-domain structure. In the time domain, LTE downlink transmissions are organized into radio frames of 10 ms, each radio frame 210 consisting of ten equally-sized subframes of length $T_{subframe}=1$ ms, in the illustrated example embodiment. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks (RBs), where a RB corresponds to one slot (0.5 ms) in the time domain and 12 contiguous subcarriers in the frequency domain. A pair of two adjacent RBs in time direction (1.0 ms) is known as a resource block pair. RBs are numbered in the frequency domain, starting with 0 from one end of the system bandwidth.

Downlink transmissions are dynamically scheduled. For example, in each subframe, the base station transmits control information about which terminals data is transmitted to and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of e.g., the control information. FIG. 3 illustrates an example downlink subframe with CFI=3 OFDM symbols as control. The reference symbols shown there are the cell specific reference symbols (CRS) and are used to support multiple functions including fine time and frequency synchronization and channel estimation for certain transmission modes.

From LTE Rel-11 onwards, DL or UL resource assignments can also be scheduled on the enhanced Physical Downlink Control Channel (EPDCCH). By contrast, according to Rel-8 to Rel-10, only the Physical Downlink Control Channel (PDCCH) is available.

Physical Downlink Control Channel and Enhanced Physical Downlink Control Channel The Physical Downlink Control Channel (PDCCH) and the Enhanced Physical Downlink Control Channel (EPDCCH) may be used to carry downlink control information (DCI) such as scheduling decisions and power-control commands. For example, DCI may include downlink scheduling assignments, including Physical Downlink Shared Channel (PDCCH) resource indication, transport format, hybrid-Automatic Repeat Request (HARQ) information, and/or control information related to spatial multiplexing where applicable. A downlink scheduling assignment may also include a command for power control of the PUCCH used for transmission of HARQ acknowledgements in response to downlink scheduling assignments. Additionally or alternatively, DCI may include uplink scheduling grants, including Physical Uplink Shared Channel (PUSCH) resource indication, transport format, and HARQ-related information. An uplink scheduling grant may also include a command for power control of the PUSCH. Additionally or alternatively, DCI may include power-control commands for a set of terminals as a complement to the commands included in the scheduling assignments/grants.

One PDCCH/EPDCCH may carry one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message may be transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

In LTE, the UL transmission scheduling command is transmitted from the eNB to the UE. There is a fixed delay between the time the scheduling command is transmitted and the time the UE transmits the UL signal specified in the standard. This delay is provisioned to allow the UE time to decode the PDCCH/EPDCCH and prepare the UL signal for transmission. For a FDD serving cell, this UL grant delay is 4 ms. For a TDD serving cell, this UL grant can be greater than 4 ms.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of carrier aggregation.

FIG. 4 illustrates aggregated bandwidth by carrier aggregation (CA). CA implies that an LTE Rel-10 terminal can receive multiple CC, where the CC have, or at least the possibility to have, the same structure as a Rel-8 carrier. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. For example, a terminal may support more downlink CCs than uplink CCs, even though the cell is configured with the same number of uplink and downlink CCs.

In addition, a key feature of carrier aggregation in the ability to perform cross-carrier scheduling. This mechanism allows an EPDCCH on one CC to schedule data transmissions on another CC by means of a 3-bit Carrier Indicator Field (CIF) inserted at the beginning of the EPDCCH messages. For data transmissions on a given CC, a wireless device may expect to receive scheduling messages on the EPDCCH on just one CC—either the same CC, or a different CC via cross-carrier scheduling. The mapping from EPDCCH to PDSCH is also configured semi-statically.

LTE Scheduling Methods

In LTE, the scheduling information of DL and UL transmission on the PCell is transmitted on the PCell using PDCCH or EPDCCH. This basic scheduling mechanism is referred to as the self-scheduling method in LTE. For a SCell, two scheduling mechanisms are supported: SCell self-scheduling and SCell cross-carrier scheduling. According to SCell self-scheduling, the scheduling information of DL and UL transmission on the SCell is transmitted on the same SCell itself using PDCCH or EPDCCH. By contrast, according to SCell cross-carrier scheduling, the network can also configure a SCell via higher layer signaling. In this approach, the scheduling information of DL and UL transmission on a SCell is transmitted on a second cell using PDCCH or EPDCCH. The second cell may be the PCell or another SCell.

For LTE, the DL and UL scheduling approaches are configured together. Thus, the DL and UL transmissions of a cell are either both self-scheduling or both cross-carrier scheduling.

Wireless Local Area Network

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle.

When the range of several access points (APs) using the same frequency overlap, all transmissions related to one AP might be deferred in case a transmission on the same frequency to or from another AP within range can be detected. Effectively, this means that if several APs are within range, they will have to share the channel in time, and the throughput for the individual APs may be severely degraded. FIG. 5 illustrates an example listen before talk (LBT) mechanism on a single unlicensed channel.

In the single-channel LBT case, after a Wi-Fi station A transmits a data frame to a station B, station B shall transmit the ACK frame back to station A with a delay of 16 μs. Such an ACK frame is transmitted by station B without performing a LBT operation. To prevent another station interfering with such an ACK frame transmission, a station shall defer for a duration of 34 μs (referred to as Distributed Coordination Function Inter-frame Spacing, or DCF Inter-frame Spacing, or DIFS) after the channel is observed to be occupied before assessing again whether the channel is occupied.

Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

The Point Coordination Function Inter-frame Spacing, or PCF Inter-frame Spacing, or PIFS, is used to gain priority access to the medium, and is shorter than the DIFS duration. Among other cases, it can be used by stations (STAs) operating under PCF, to transmit Beacon Frames with priority. At the nominal beginning of each Contention-Free Period (CFP), the PC shall sense the medium. When the medium is determined to be idle for one PIFS period (generally 25 μs), the PC shall transmit a Beacon frame containing the CF Parameter Set element and a delivery traffic indication message element.

Load-Based Clear Channel Assessment

For a device not utilizing the Wi-Fi protocol, Europe Regulation EN 301.893, v. 1.7.1 provides the certain requirements and minimum behavior for the load-based clear channel assessment. FIG. 6 illustrates an example LBT mechanism in conformance with EN 301.893. The requirements and minimum behavior are as follows:

1. Before a transmission or a burst of transmissions on an operating channel, the equipment shall perform a CCA check by detecting the energy level of the operating channel. The equipment shall observe the operating channel(s) for the duration of the CCA observation time, which is set by the manufacturer and shall be not less than 20 μs. The Operating Channel shall be considered occupied if the energy level in the channel exceeds the threshold corresponding to the power level given in enumerated point #5 below. If the equipment finds the channel to be clear, it may send transmissions immediately (see point #3 below).

2. If during CCA check, the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that needs to be observed before initiation of the transmission. The value of N shall be randomly selected in the range 1 . . . q every time an Extended CCA (eCCA) is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit.

It should be noted that the equipment is allowed to continue Short Control Signaling Transmissions on this channel providing it complies with the requirements in clause 4.9.2.3.

For equipment having simultaneous transmissions on multiple (adjacent or non-adjacent) operating channels, the equipment is allowed to continue transmissions on other operating channels providing the CCA check did not detect any signals on those channels.

3. The total time that an equipment makes use of an operating channel is the maximum channel occupancy time which shall be less than (13/32)×q ms, with q as defined in point #2 above. After the maximum channel occupancy time, the device shall perform the extended CCA described in point #2 above.

4. Upon correct reception of a packet which was intended for the equipment, the equipment may skip CCA and immediately proceed with the transmission of management and control frames (e.g. ACK and Block ACK frames). A consecutive sequence of transmissions by the equipment, without it performing a new CCA, shall not exceed the maximum channel occupancy time as defined in point #3 above.

For the purpose of multi-cast, the ACK transmissions (associated with the same data packet) of the individual devices are allowed to take place in a sequence.

5. The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

Licensed-Assisted Access (LAA) to Unlicensed Spectrum Using LTE

Up to now, the spectrum used by LTE has been dedicated to LTE. This has the advantage that the LTE system does not need to care about the coexistence issue and the spectrum efficiency can be maximized. However, the spectrum allocated to LTE is limited, and the allocated spectrum cannot meet the ever increasing demand for larger throughput from applications and/or services. Therefore, a new work item has been initiated in 3GPP on extending LTE to exploit unlicensed spectrum in addition to licensed spectrum.

FIG. 7 illustrates licensed-assisted access (LAA) to unlicensed spectrum using LTE carrier aggregation. As depicted, a wireless device is connected to a primary cell (PCell) in the licensed band and one or more secondary cells (SCells) in the unlicensed band. Herein, a secondary cell in unlicensed spectrum may be referred to as a LAA secondary cell (LAA SCell). The LAA SCell may operate in downlink only mode or operate with both UL and DL traffic. Furthermore, certain embodiments may include LTE nodes operating in stand-alone mode in license-exempt channels without assistance from a licensed cell. Unlicensed spectrum can, by definition, be simultaneously used by multiple different technologies. Therefore, LTE needs to consider the coexistence issue with other systems such as IEEE 802.11 (Wi-Fi).

For LAA, the backoff counter does not have to be decremented when a slot is sensed to be idle during the ECCA procedure. Additionally, any subframe can be used for either DL or UL transmission.

To coexist fairly with the Wi-Fi system, transmission on the SCell must conform to LBT protocols in order to avoid collisions and causing interference to on-going transmissions. This includes both performing LBT before commencing transmissions, and limiting the maximum duration of a single transmission burst. The maximum transmission burst duration is specified by country and region-specific relations, e.g., 4 ms in Japan and 13 ms according to EN 301.893.

FIG. 8 illustrates LAA to the unlicensed spectrum with LBT and UL and DL transmissions within a transmission opportunity (TXOP). Specifically, in the example depicted, a 4 ms LAA TXOP after successful LBT consists of a DL transmission burst with two subframes followed by an UL transmission burst of two subframes. Thus, there is TXOP sharing between the downlink and the uplink. The UL burst may perform a single CCA, a short extended CCA, or no CCA before transmission.

UL Transmission in LAA

There may be two possible approaches to support UL transmission on an LAA SCell. In the first approach, the UE follows an LBT protocol to attempt channel access after receiving the UL transmission scheduling command. FIG. 9 illustrates UL LAA transmissions based on an UL LBT protocol. In the depicted example, the system has a 4 ms channel occupancy time. Thus, the LBT protocol is designed to allow 4 ms DL channel occupancy time and 4 ms UL channel occupancy time.

According to a second approach, the UE does not follow any LBT protocol to initiate channel access after receiving the UL transmission scheduling command. FIG. 10 illustrates UL LAA transmissions based on a reverse direction grant (RDG) protocol. In the depicted example, the system has an 8 ms channel occupancy time. Thus, the LBT protocol is designed to allow 8 ms total channel occupancy time between DL and UL transmissions. LBT and CCA are performed by the eNB before the start of DL transmissions.

Currently, there is no uplink control information (UCI) design for LTE operation on the unlicensed spectrum.

SUMMARY

To address the foregoing problems with existing solutions, disclosed is systems and methods for uplink control information (UCI) signaling design for operation on the unlicensed spectrum.

According to certain embodiments, a method by a wireless device is provided for transmitting uplink control information (UCI) on a serving cell on the unlicensed spectrum. The method includes formatting the UCI as a shortened control signalling transmission and transmitting the UCI formatted as the shortened control signalling transmission to a network node. The shortened control signalling transmission is transmitted during a transmission opportunity on the serving cell on the unlicensed spectrum without performing channel sensing.

According to certain embodiments, a method by a wireless device is provided for transmitting at least one hybrid automatic repeat request (HARQ) acknowledgement on a serving cell on the unlicensed spectrum. The method includes determining, by the wireless device, whether the wireless device has channel access to at least one serving cell on the unlicensed spectrum on which physical uplink shared channel (PUSCH) transmission is scheduled. If the wireless device has channel access to the at least one serving cell on which the PUSCH transmission is scheduled, the at least one HARQ acknowledgement is transmitted on the at least one serving cell multiplexed with scheduled PUSCH data. Conversely, if the wireless device does not have channel access to the at least one serving cell on which the PUSCH transmission is scheduled, the at least one HARQ acknowledgement is formatted in a shortened physical uplink control channel (PUCCH) transmission format, and the at least one HARQ acknowledgement is transmitted in the shortened PUCCH transmission format during a transmission opportunity on at least one serving cell on the unlicensed spectrum without performing channel sensing.

According to certain embodiments, a method by a network node is provided for configuring transmission of uplink control information (UCI) on a selected one of a plurality of cells. The method includes assigning, by the network node, each of the plurality of cells to a selected one of a plurality of cell groups. A cell selection is transmitted to a wireless device. The cell selection identifies a cell within each the plurality of cell groups for use in transmitting the UCI.

According to certain embodiments, a method by a wireless device is provided for transmitting uplink control information (UCI). The method includes performing a carrier sensing procedure. Based on the carrier sensing procedure, it is determined whether the wireless device has channel access on at least one secondary cell (SCell) on the unlicensed spectrum. If the wireless device has channel access to the at least one SCell on the unlicensed spectrum, the UCI is transmitted on the at least one SCell. If the wireless device does not have channel access to the at least one SCell on the unlicensed spectrum, the UCI is scheduled to be transmitted on a cell on the licensed spectrum in a next transmission.

Certain embodiments of the present disclosure may provide one or more technical advantages. For example, certain embodiments may provide good backwards compatibility with legacy UCI mechanisms. Another advantage may be that certain embodiments provide high reliability for UCI for a licensed carrier. Still another advantage may be that certain embodiments provide a greater probability of quick UCI feedback on an unlicensed carrier.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
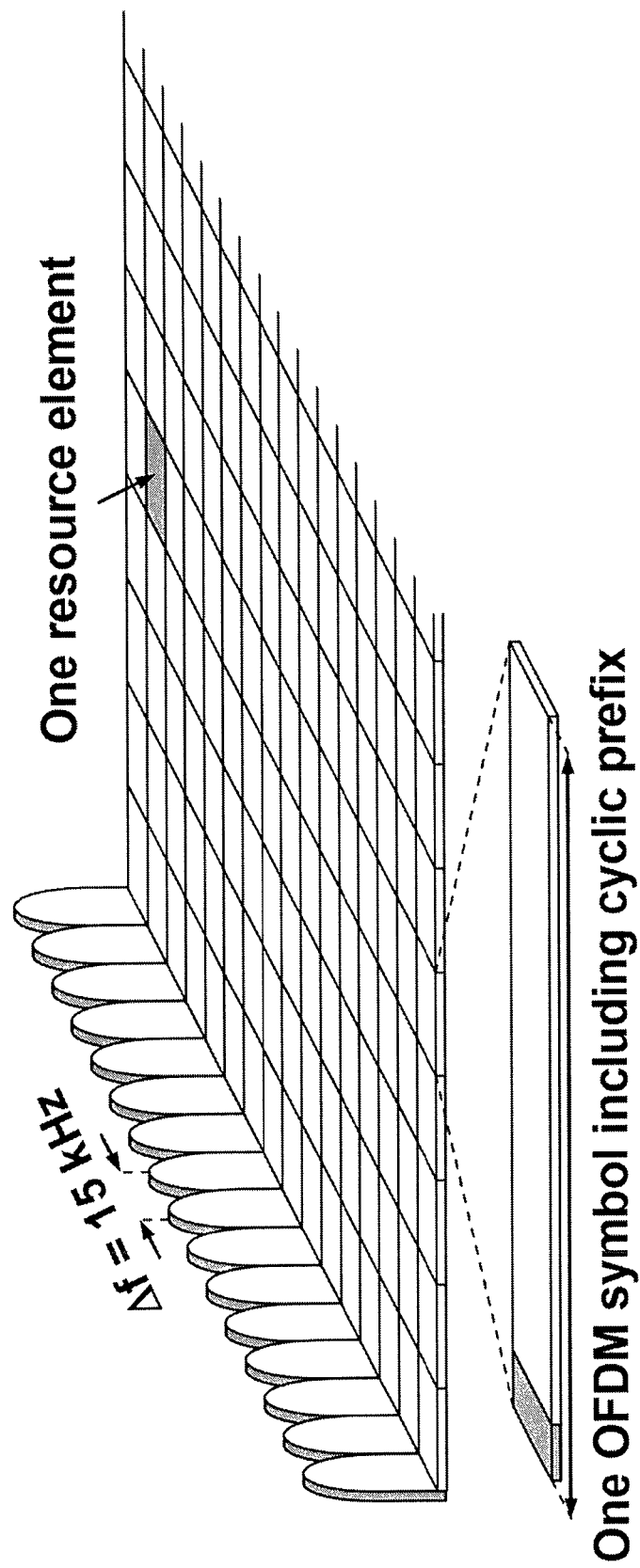
FIG. 1 illustrates the basic LTE downlink physical resource.
Figure 2:
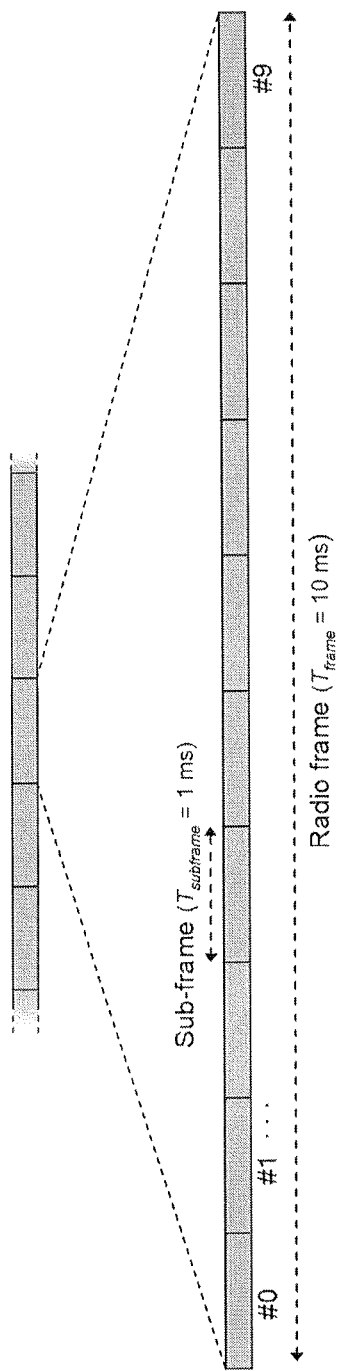
FIG. 2 illustrates the LTE time-domain structure.
Figure 3:
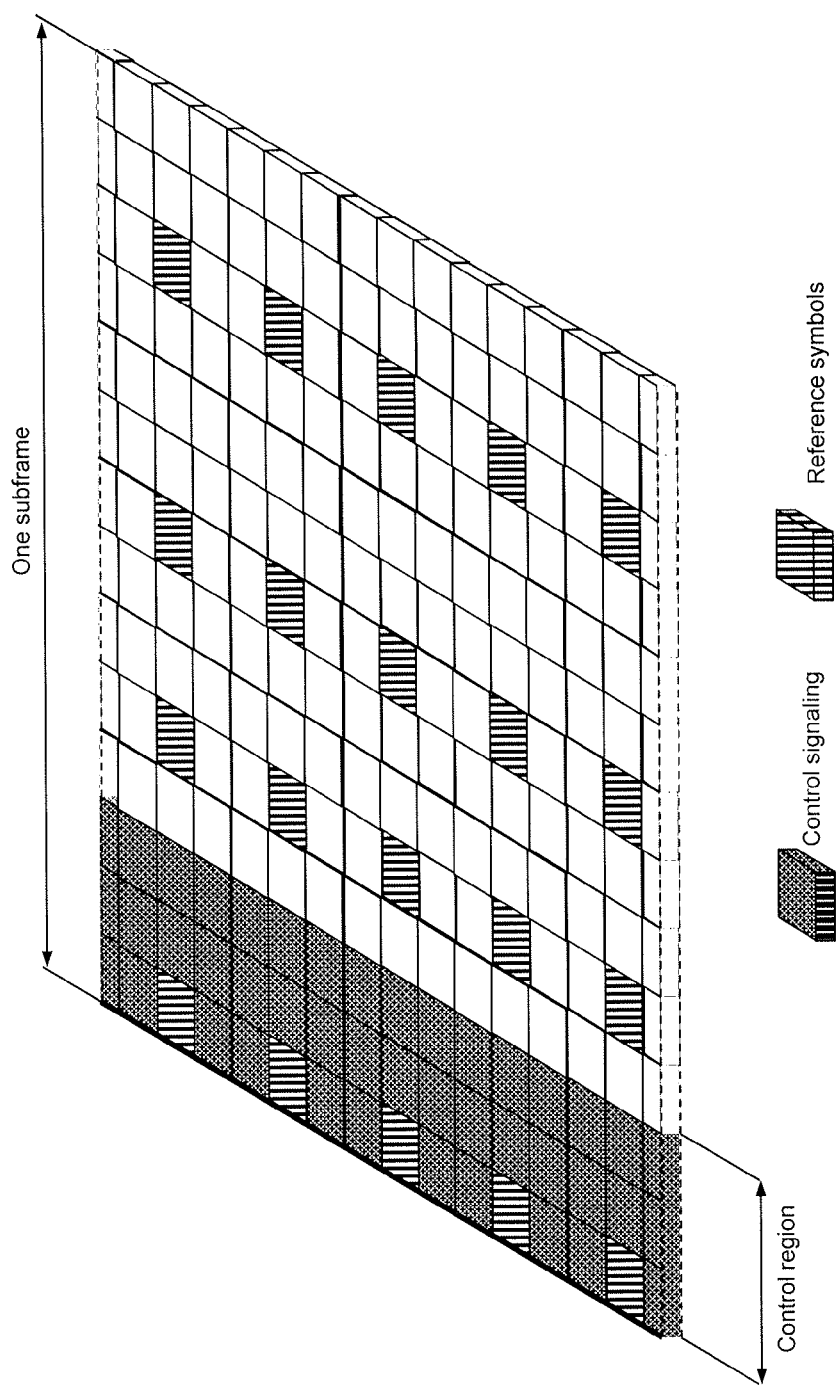
FIG. 3 illustrates an example downlink subframe.
Figure 4:
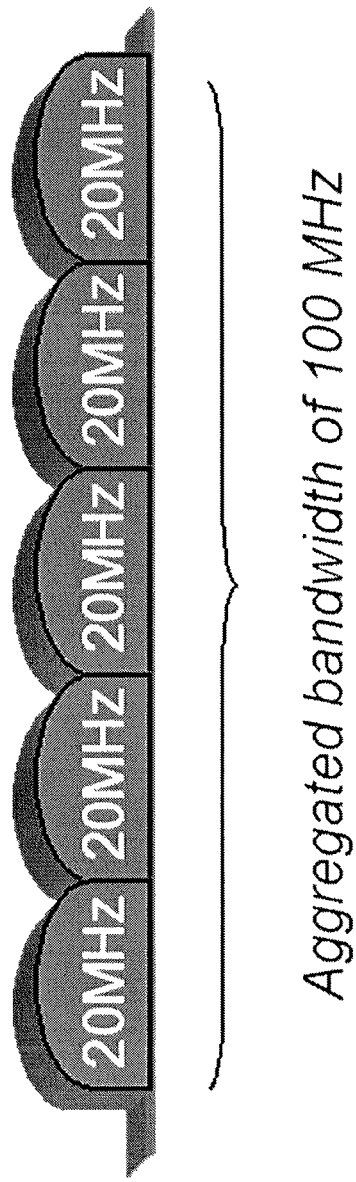
FIG. 4 illustrates aggregated bandwidth by carrier aggregation.
Figure 5:
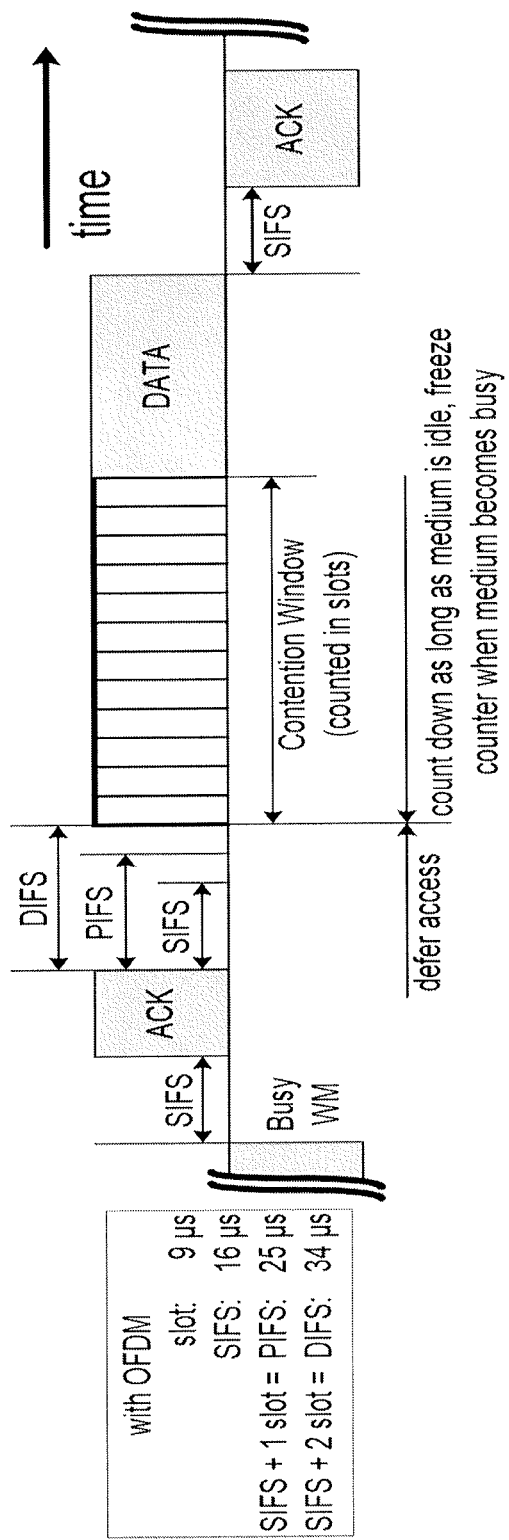
FIG. 5 illustrates an example listen before talk (LBT) mechanism on a single unlicensed channel.
Figure 6:
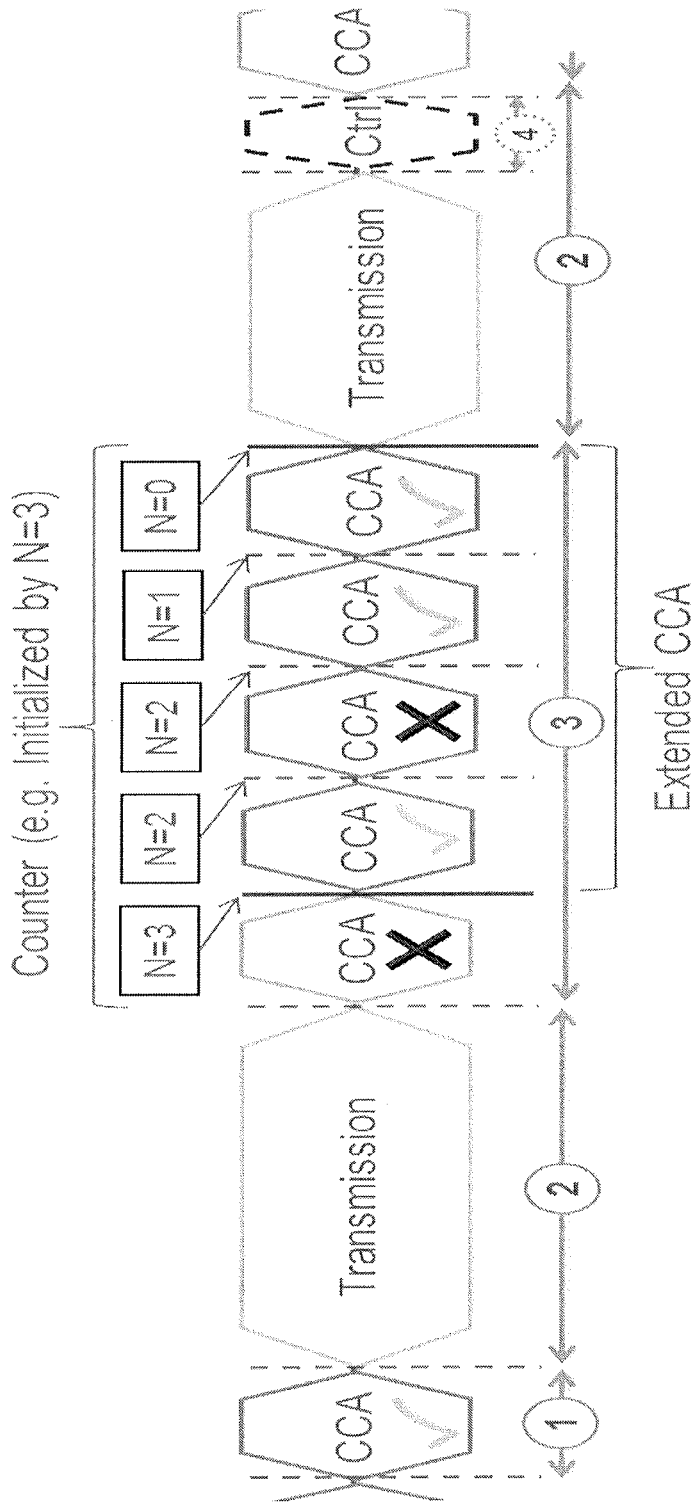
FIG. 6 illustrates another example LBT mechanism.
Figure 7:
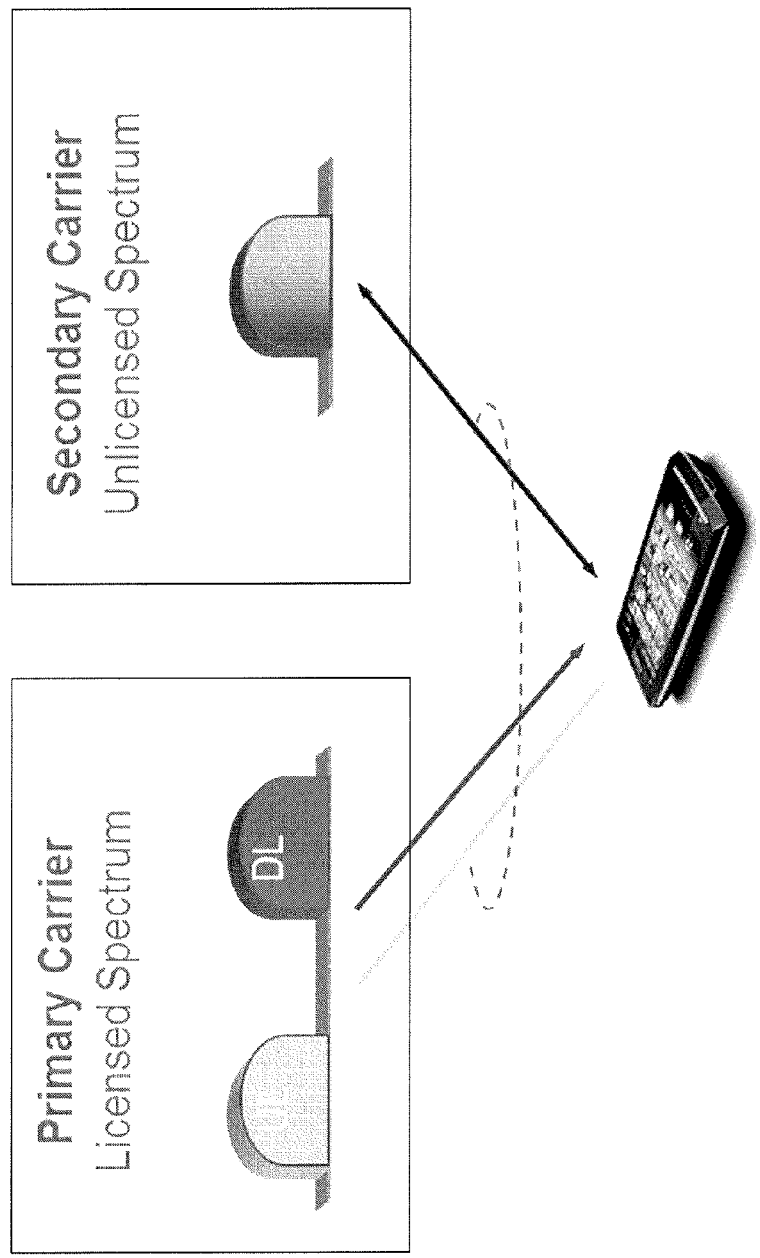
FIG. 7 illustrates licensed-assisted access (LAA) to unlicensed spectrum using LTE carrier aggregation.
Figure 8:
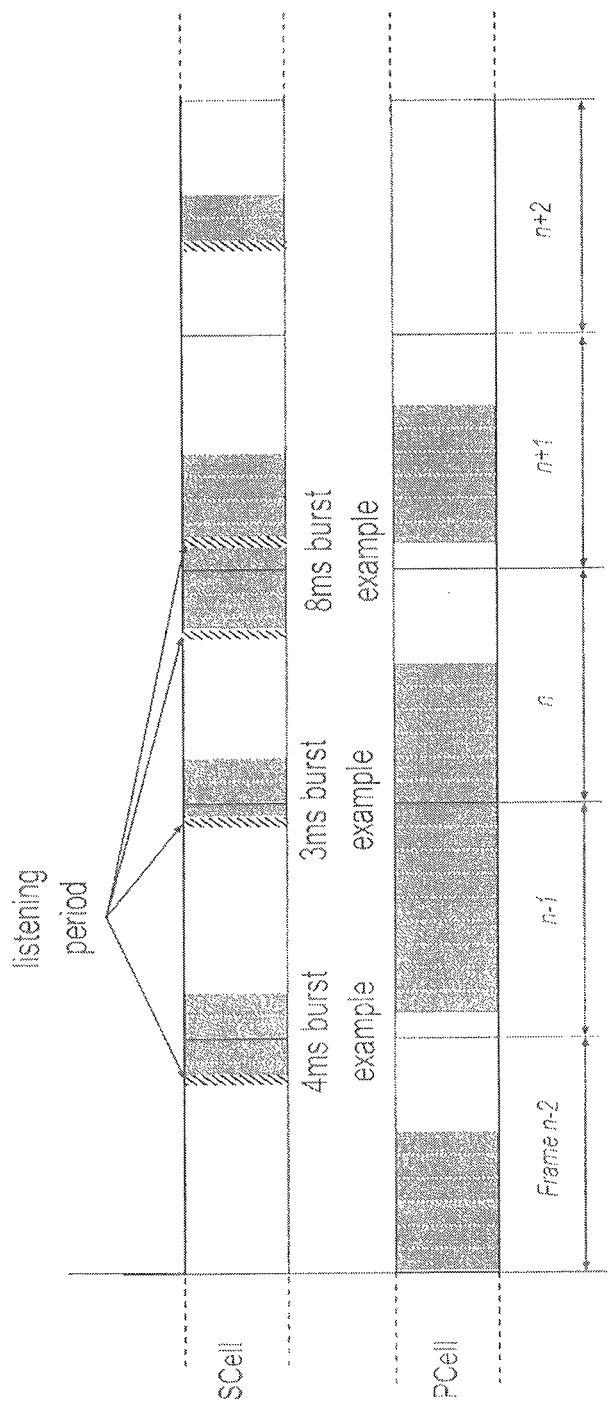
FIG. 8 illustrates LAA to the unlicensed spectrum with LBT and uplink (UL) and downlink (DL) transmissions within a transmission opportunity (TXOP)
Figure 9:
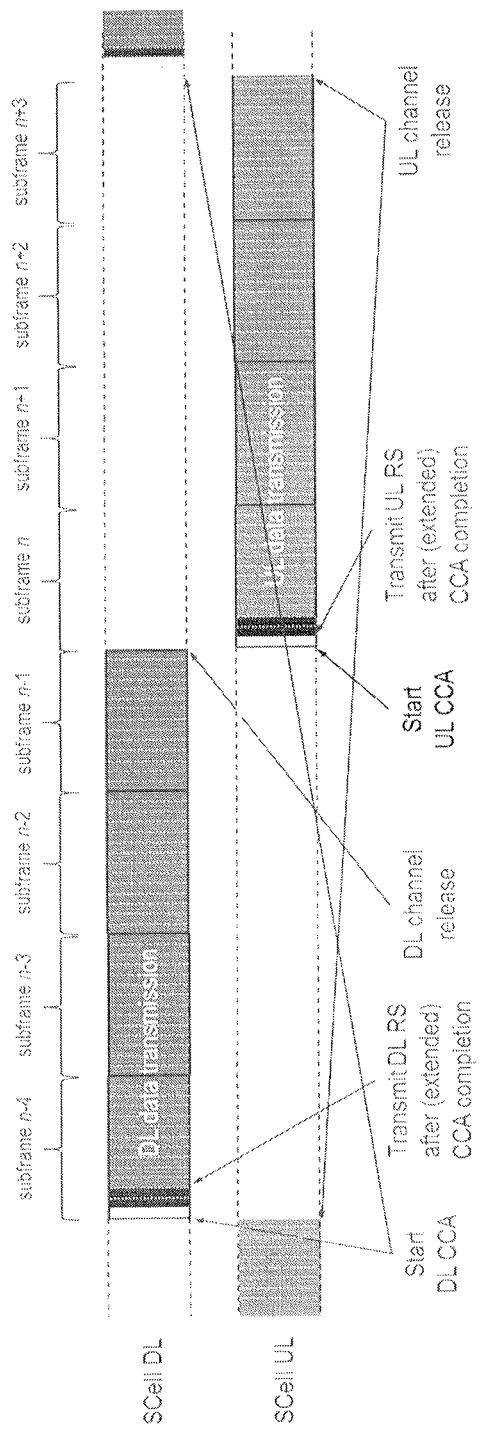
FIG. 9 illustrates UL LAA transmissions based on an UL LBT protocol.
Figure 10:
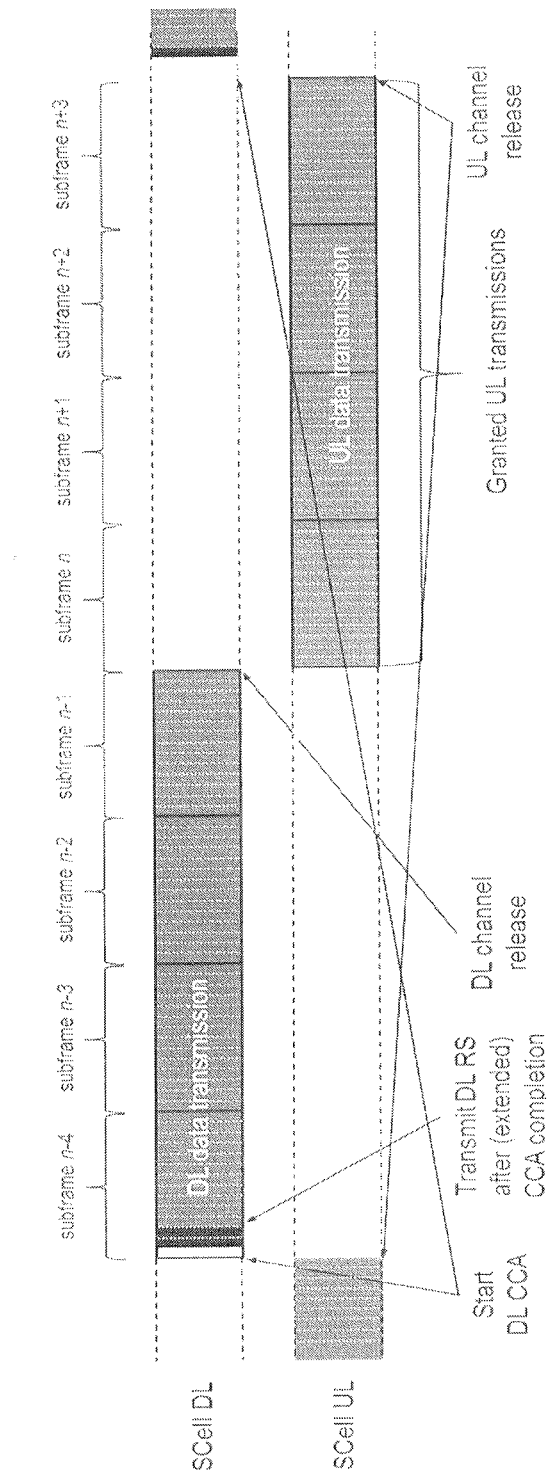
FIG. 10 illustrates UL LAA transmissions based on a reverse direction grant protocol.
Figure 11:
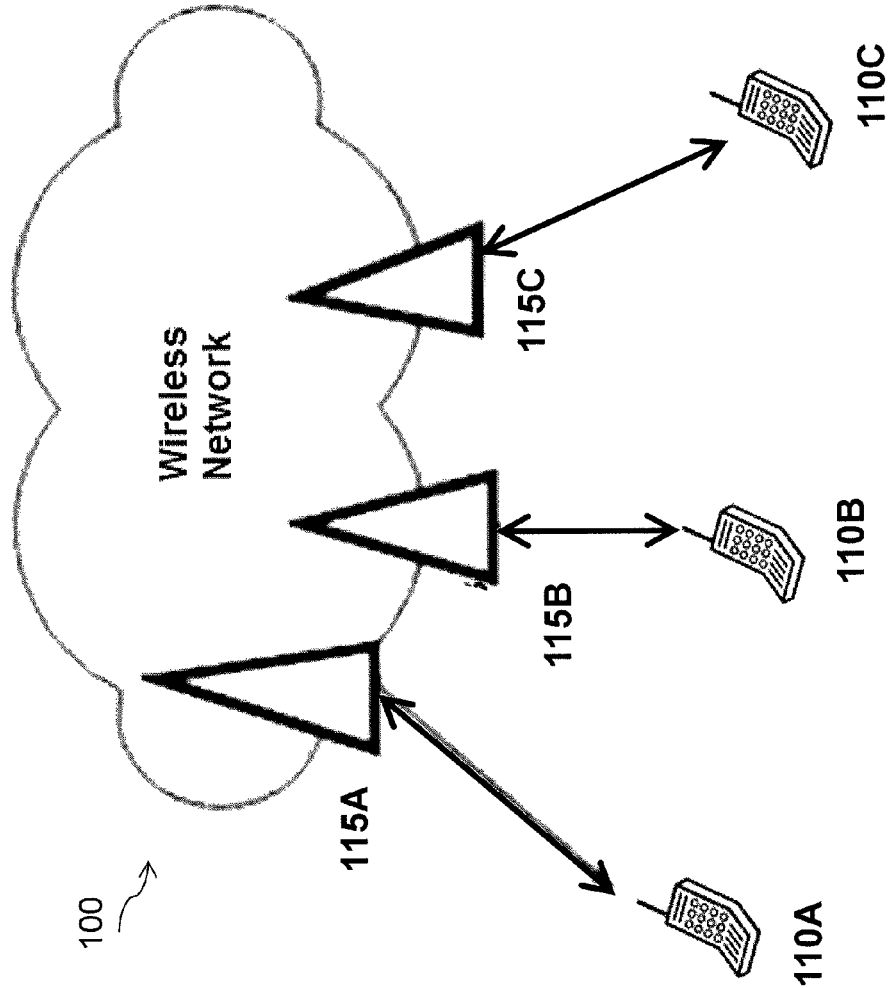
FIG. 11 illustrates an exemplary network node for uplink control information (UCI) signaling design for LAA, in accordance with certain embodiments.

FIG. 11 is a block diagram illustrating an embodiment of a network 100 implementing uplink control information (UCI) signaling design for LAA, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 11). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 110, network nodes 115, and other network nodes (such as radio network controller or core network node) are described in more detail with respect to FIGS. 12, 17, and 22, respectively.

Although FIG. 11 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The UCI signaling techniques described herein are applicable to both LAA LTE and standalone LTE operation in license-exempt channels. The described techniques are generally applicable for transmissions from both network nodes 115 and wireless devices 110. Likewise, the techniques are applicable to both frequency-division duplex (FDD) and time-division duplex (TDD) systems.

Figure 12:
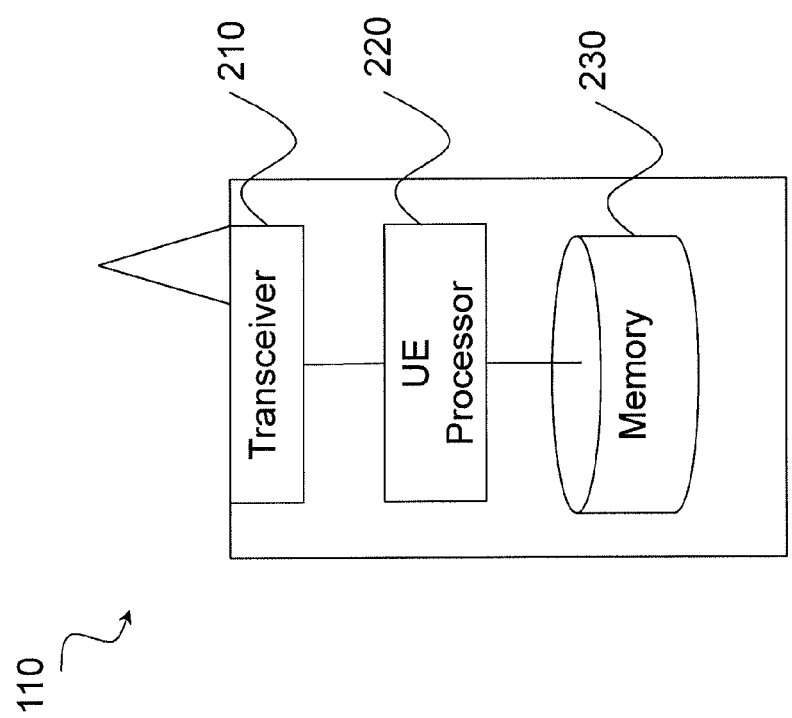
FIG. 12 illustrates an exemplary wireless device for transmitting UCI on a serving cell in the unlicensed spectrum, in accordance with certain embodiments.

FIG. 12 illustrates an example wireless device 110 for transmitting UCI on a serving cell in the unlicensed spectrum, in accordance with certain embodiments. As depicted, wireless device 110 includes transceiver 210, processor 220, and memory 230. In some embodiments, transceiver 210 facilitates transmitting wireless signals to and receiving wireless signals from network node 115 (e.g., via an antenna), processor 220 executes instructions to provide some or all of the functionality described above as being provided by wireless device 110, and memory 230 stores the instructions executed by processor 220.

Processor 220 may include any suitable combination of hardware and software implemented in one or more modules to execute instructions and manipulate data to perform some or all of the described functions of wireless device 110. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 12 that may be responsible for providing certain aspects of the wireless device's functionality, including any of the functionality described above and/or any additional functionality (including any functionality necessary to support the solution described above).

Figure 13:
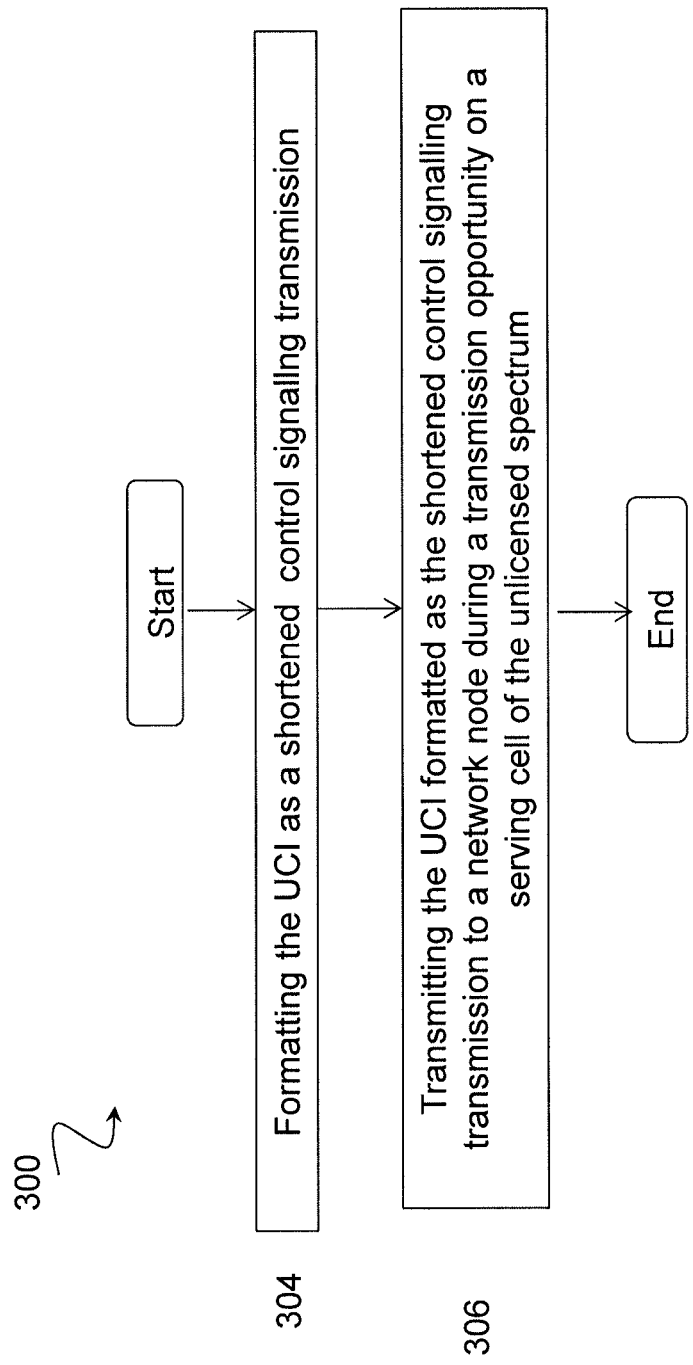
FIG. 13 illustrates an exemplary method by a wireless device for transmitting UCI on a serving cell in the unlicensed spectrum, in accordance with certain embodiments.

FIG. 13 illustrates an exemplary method 300 by a wireless device 110 for transmitting UCI on a serving cell in the unlicensed spectrum, in accordance with certain embodiments. The method begins at step 304 when the UCI is formatted as a shortened control signaling transmission. In certain embodiments, the UCI may include a HARQ acknowledgement. In certain embodiments, the shortened control signaling transmission is a shortened physical uplink control channel (PUCCH) format. The PUCCH format may be transmitted on N OFDM symbols, wherein 0<=N<=7.

In other embodiments, the UCI may include aperiodic control signaling information (CSI) and the shortened control signaling transmission may be a shortened physical uplink shared channel (PUSCH) format. The PUSCH format may be transmitted on N OFDM symbols, wherein 0<=N<=7.

At step 306, the UCI formatted as the shortened control signaling transmission is transmitted to a network node 115. In certain embodiments, the shortened control signaling transmission is transmitted during a transmission opportunity (TxOP) on the serving cell on the unlicensed spectrum without performing channel sensing prior to the transmission. In certain embodiments, the UCI transmission follows the RDG protocol and transmitted after a DL transmission during a transmission opportunity. In certain embodiments, the duration of the shortened control signaling transmission may not exceed a maximum threshold. For example, the maximum threshold may be approximately five percent of the transmission opportunity, in a particular embodiment. In certain embodiments, the serving cell includes a license assisted access SCell on the unlicensed spectrum. In certain embodiments, the serving cell includes a cell operating on the unlicensed spectrum without assistance from a licensed cell.

Figure 14:
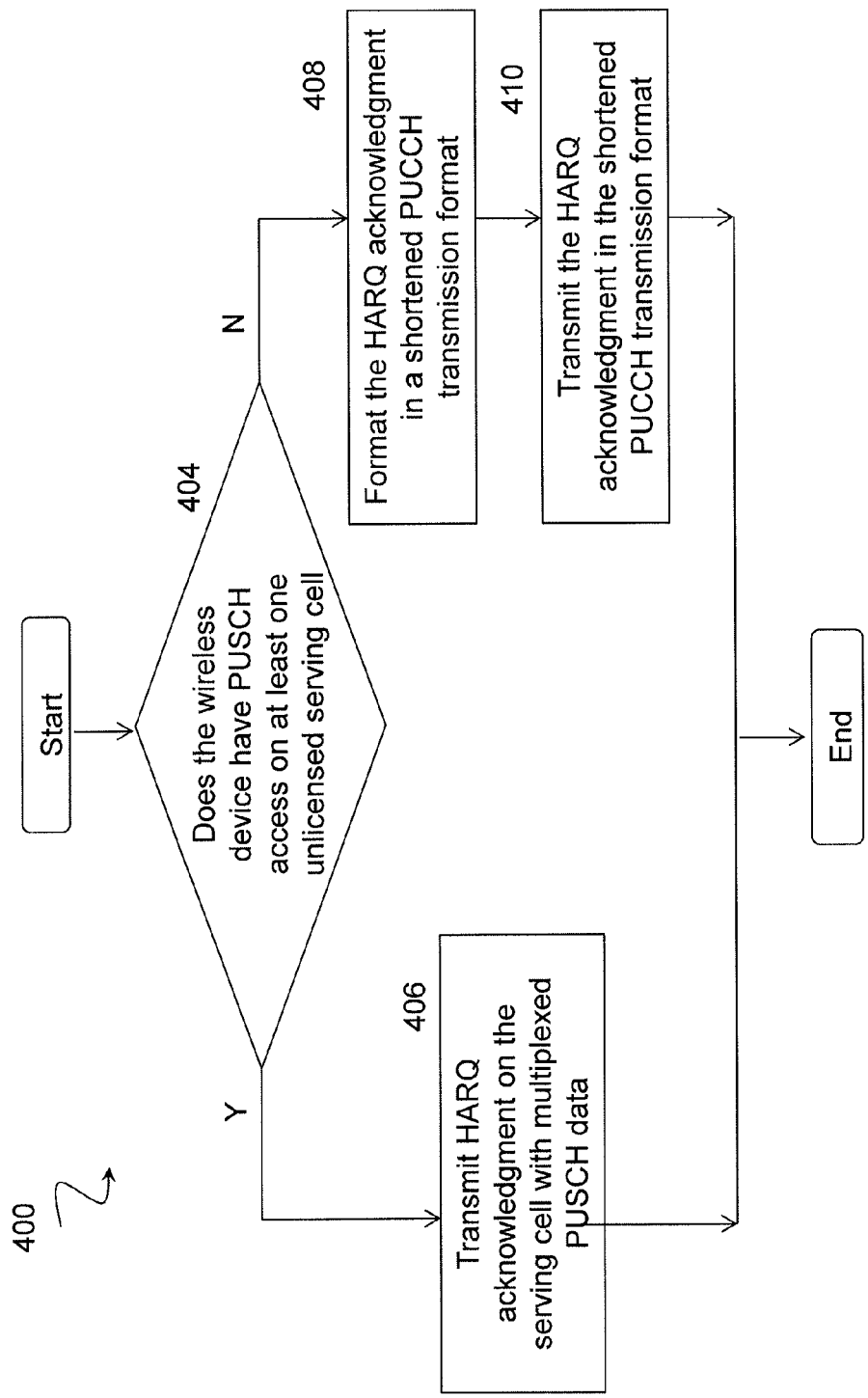
FIG. 14 illustrates an exemplary method by a wireless device for transmitting a hybrid automatic repeat request (HARQ) acknowledgment on a serving cell in the unlicensed spectrum, in accordance with certain embodiments.

FIG. 14 illustrates an exemplary method by a wireless device for transmitting a hybrid automatic repeat request (HARQ) acknowledgment on a serving cell in the unlicensed spectrum, in accordance with certain embodiments. The method begins at step 404 when it is determined whether the wireless device 110 has PUSCH access on at least one unlicensed serving cell. In certain embodiments, the serving cell may include a license assisted access SCell on the unlicensed spectrum. In certain embodiments, the serving cell includes a cell operating on the unlicensed spectrum without assistance from a licensed cell.

If it is determined that the wireless device 110 has PUSCH access on the at least one unlicensed serving cell, the method continues to step 406. At step 406, a HARQ acknowledgment is transmitted on the serving cell with multiplexed PUSCH. The method may then terminate. In a particular embodiment, the PUSCH transmission may be transmitted on a plurality of uplink carriers, and an uplink carrier must be selected from the plurality of uplink carriers for transmitting HARQ acknowledgement. For example, the selected uplink carrier may be the same carrier as the PUCCH transmission is transmitted on, a carrier with a highest cell index, a carrier with a lowest cell index, and/or a carrier on which an aperiodic CSI report is requested to be transmitted.

Returning to step 404, if it is determined instead that the wireless device 110 does not have PUSCH access on the at least one unlicensed serving cell, the method continues to step 408. At step 408, the HARQ acknowledgment is formatted in a shortened PUCCH transmission format. The shortened PUCCH transmission format is then transmitted, at step 410, during a transmission opportunity on at least one serving cell on the unlicensed spectrum without performing channel sensing. In certain embodiments, the UCI transmission follows the RDG protocol and transmitted after a DL transmission during a transmission opportunity. In certain embodiments, the duration of the shortened PUCCH transmission format may not exceed a maximum threshold. For example, the maximum threshold may be approximately five percent such that the shortened PUCCH transmission format does may not exceed approximately five percent of the transmission opportunity.

Figure 15:
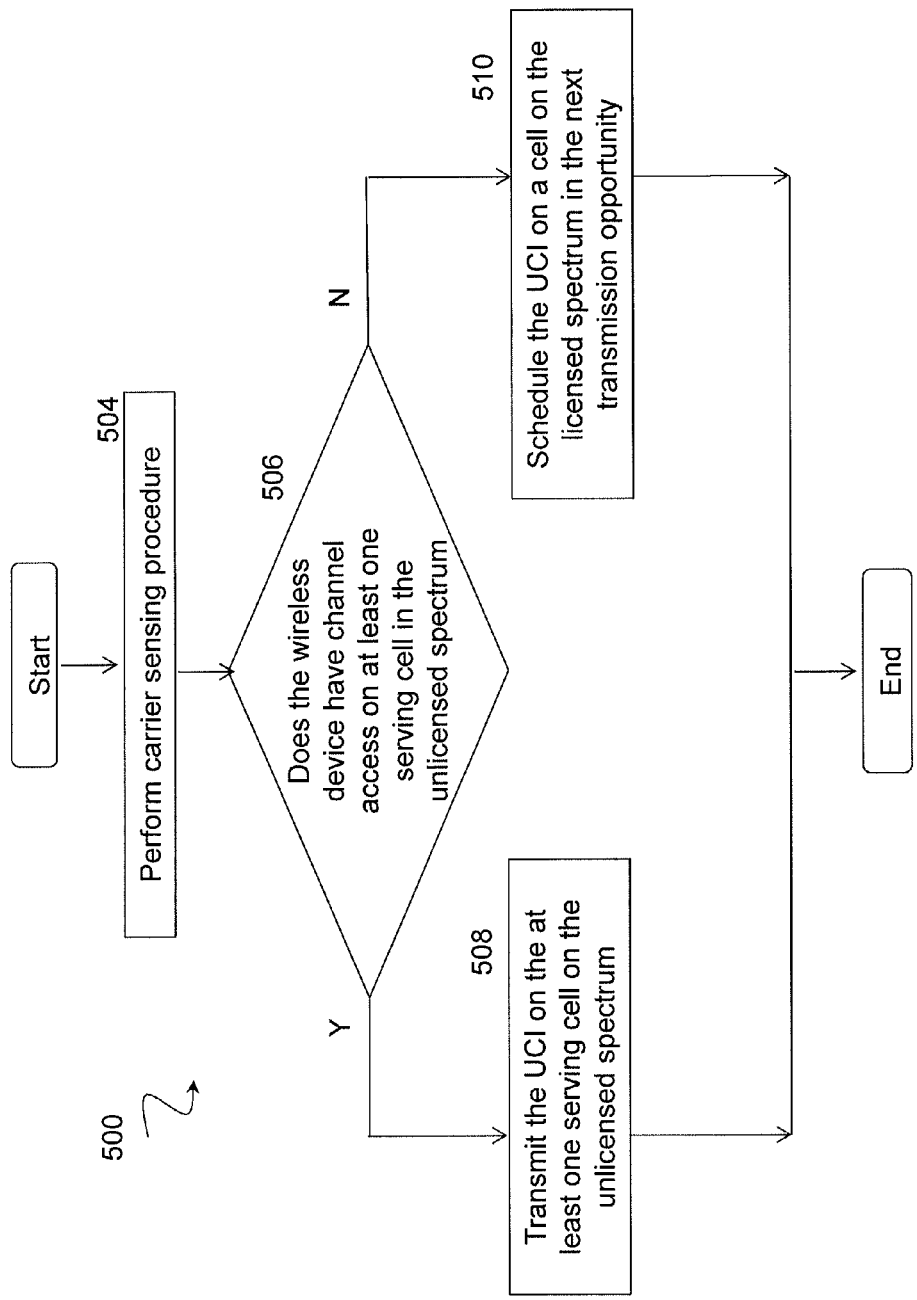
FIG. 15 illustrates an alternative exemplary method by a wireless device for transmitting UCI, in accordance with certain embodiments.

FIG. 15 illustrates an alternative exemplary method 500 by a wireless device 110 for transmitting UCI, in accordance with certain embodiments. The method begins at step 504 when a carrier sensing procedure is performed. Based on the carrier sensing procedure, it is determined, at step 506, whether the wireless device 110 has channel access on at least one serving cell on the unlicensed spectrum. In certain embodiments, the serving cell may include a license assisted access SCell on the unlicensed spectrum. In certain embodiments, the serving cell includes a cell operating on the unlicensed spectrum without assistance from a licensed cell.

If the wireless device 110 has channel access on the at least one serving cell on the unlicensed spectrum, the method proceeds to step 508, and the UCI is transmitted on the at least one serving cell on the unlicensed spectrum. Conversely, if it is determined at step 504 that the wireless device 110 does not have channel access on the at least one serving cell on the unlicensed spectrum, the method proceeds to step 510. At step 510, the UCI is scheduled on a cell on the licensed spectrum in the next transmission opportunity. In certain embodiments, the UCI includes aperiodic CSI. In other embodiments, the UCI may include a HARQ acknowledgment.

Figure 16:
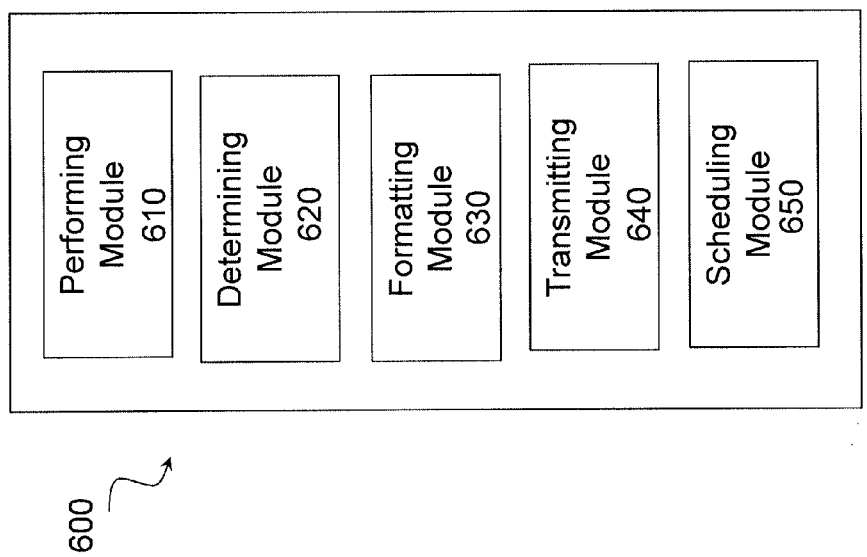
FIG. 16 illustrates an exemplary computer networking virtual apparatus for transmitting UCI on a serving cell in the unlicensed spectrum, in accordance with certain embodiments.

In certain embodiments, the method for transmitting UCI on a serving cell in the unlicensed spectrum as described above may be performed by a computer networking virtual apparatus. FIG. 16 illustrates an example computer networking virtual apparatus 600 for transmitting UCI on a serving cell in the unlicensed spectrum, according to certain embodiments. In certain embodiments, computer networking virtual apparatus 600 may include modules for performing methods similar to those illustrated and described with regard to FIGS. 13, 14, and 15. For example, in the depicted embodiment, computer virtual apparatus 600 includes at least one performing module 610, at least one determining module 620, at least one formatting module 630, at least one transmitting module 640, at least one scheduling module 650, and any other suitable modules for transmitting UCI on a serving cell in the unlicensed spectrum. In some embodiments, one or more of the performing module 610, determining module 620, formatting module 630, transmitting module 640, scheduling module 650, or any other suitable module may be implemented using one or more processors 220 of FIG. 12. In certain embodiments, the functions of two or more of the various modules may be combined into a single module. Further, though the computer virtual apparatus 600 is depicted as including a module for performing each of the operations described above with regard to the combination of FIGS. 13, 14, and 15, it is recognized that computer virtual apparatus 600 may include modules for performing the operations of a selected one of the methods described above with regard to FIGS. 13, 14, and 15. For example, computer virtual apparatus 600 that performs the method of FIG. 13 may include only formatting module 630 and transmitting module 640.

The at least one performing module 610 may perform any performing functions of computer networking virtual apparatus 600. For example, performing module 610 may perform a carrier sensing procedure, in a particular embodiment.

The at least one determining module 620 may perform any determining functions of computer networking virtual apparatus 600. For example, in a particular embodiment, determining module 620 may determine, based on the carrier sensing procedure performed by performing module 610, whether a wireless device 110 has channel access on at least one serving cell on the unlicensed spectrum. In another embodiment, determining module 610 may determine whether a wireless device 110 has channel access to at least one serving cell on the unlicensed spectrum on which a PUSCH transmission is scheduled.

The formatting module 630 may perform any formatting functions of computer networking virtual apparatus 600. For example, formatting module 630 may format a UCI as a shortened control signalling transmission. In certain embodiments, the shortened control signalling transmission may include a shortened PUCCH format. For example, a HARQ acknowledgement may be formatted as a shortened PUCCH format. In other embodiments, the shortened control signalling transmission may include a shortened PUSCH format.

The transmitting module 640 may perform the transmitting functions of computer networking virtual apparatus 600. For example, transmitting module 640 may transmit, to a network node 115, a UCI formatted as a shortened control signalling transmission. The shortened format may be transmitted during a transmission opportunity on a serving cell on the unlicensed spectrum without performing channel sensing, in certain embodiments. In other embodiments, transmitting module 640 may transmit at least one HARQ acknowledgment multiplexed with scheduled PUSCH data where the wireless device 110 has channel access to the serving cell on the unlicensed spectrum on which a PUSCH transmission is scheduled. In still other embodiments, if the wireless device does not have channel access to the serving cell on which the PUSCH transmission is scheduled, transmitting module 640 may transmit a HARQ acknowledgement in the shortened PUCCH transmission format during a transmission opportunity on the serving cell in the unlicensed spectrum without performing channel sensing. In still another embodiment, transmitting module 640 may transmit UCI on the at least one serving cell where the wireless device 110 has channel access to the at least one serving cell on the unlicensed spectrum.

The scheduling module 650 may perform the scheduling functions of computer networking virtual apparatus 600. For example, scheduling module 650 may schedule a UCI to be transmitted on a cell on the licensed spectrum in a next transmission where the wireless device 110 does not have channel access to the at least one serving cell on the unlicensed spectrum.

Other embodiments of computer networking virtual apparatus 600 may include additional components beyond those shown in FIG. 16 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 17:
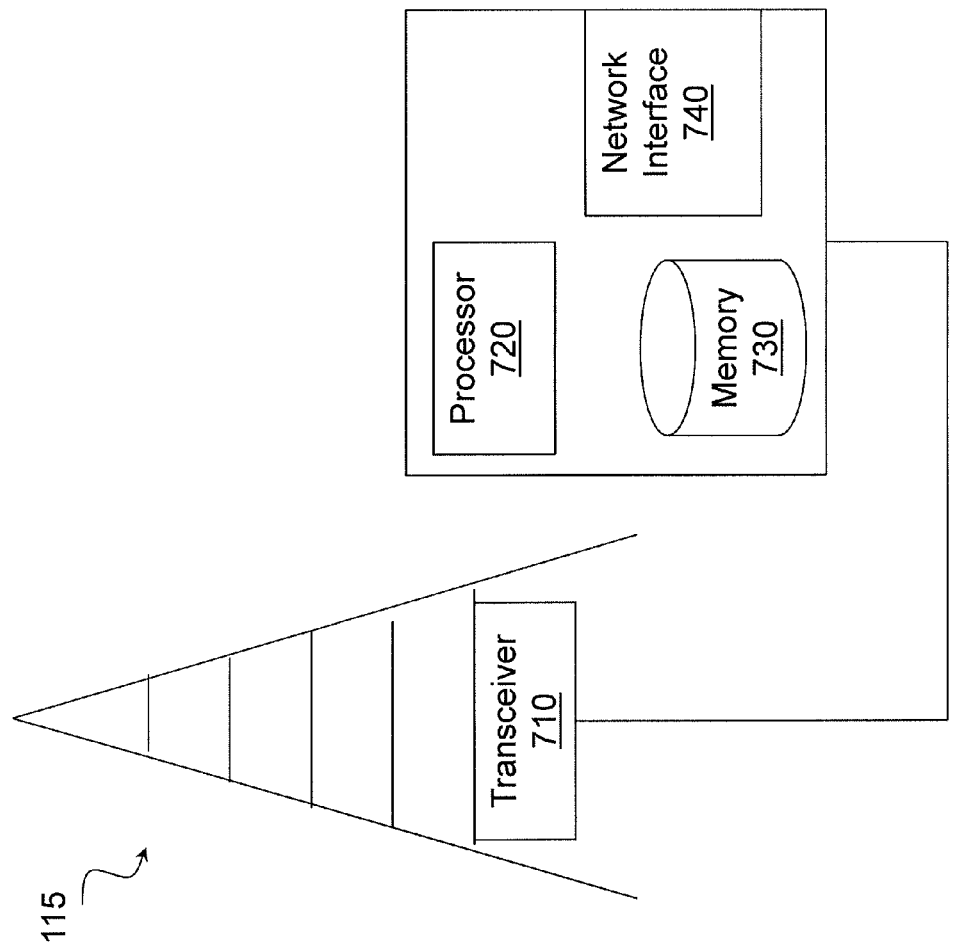
FIG. 17 illustrate an example network node for configuring transmission of UCI on a selected cell, according to certain embodiments.

FIG. 17 illustrate an example network node for configuring transmission of UCI on a selected cell, according to certain embodiments. As described above, network node 115 may be any type of radio network node or any network node that communicates with a wireless device and/or with another network node. Examples of a network node 1115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processor 720, memory 730, and network interface 740. In some embodiments, transceiver 710 facilitates transmitting wireless signals to and receiving wireless signals from wireless device 110 (e.g., via an antenna), processor 720 executes instructions to provide some or all of the functionality described above as being provided by a network node 115, memory 730 stores the instructions executed by processor 720, and network interface 740 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 720 may include any suitable combination of hardware and software implemented in one or more modules to execute instructions and manipulate data to perform some or all of the described functions of network node 115. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 17 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 18:
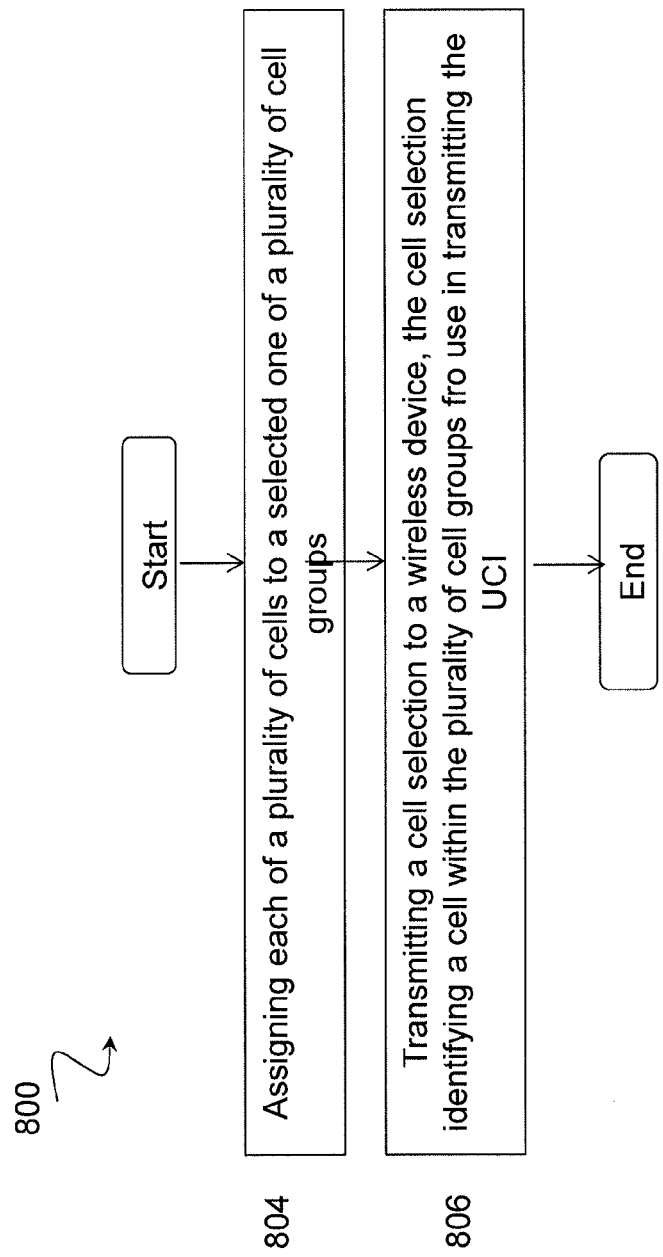
FIG. 18 illustrates an example method for configuring transmission of UCI on a selected cell, according to certain embodiments.

FIG. 18 illustrates an example method 800 by network node 115 for configuring transmission of UCI on a selected cell, according to certain embodiments. The method begins at step 804 when each of a plurality of cells is assigned to a selected one of a plurality of cell groups. Example cell grouping schemes are described below with regard to FIGS. 19 and 20.

At step 806, a cell selection is transmitted to a wireless device 110. The cell selection may identify a cell within each of the plurality of cell groups for use in transmitting UCI by the wireless device 110. In certain embodiments, the UCI may include a HARQ acknowledgement. In other embodiments, the UCI may include aperiodic CSI.

Figure 19:
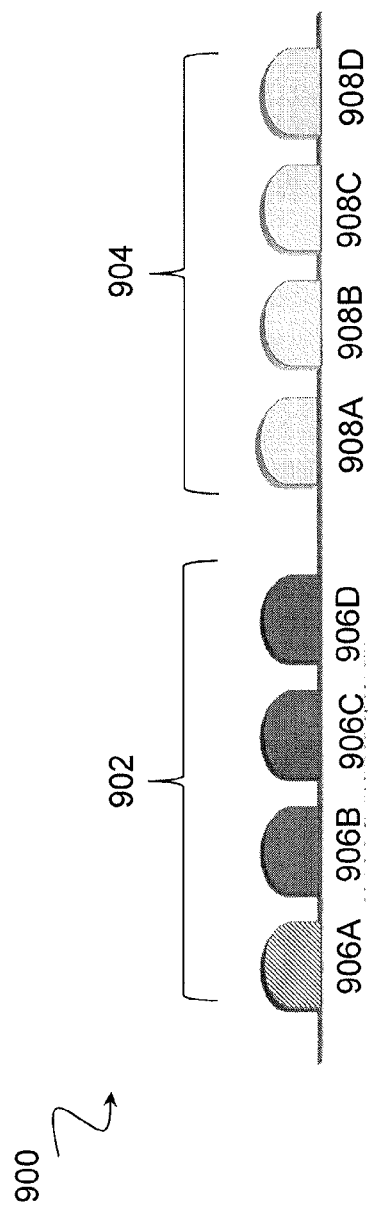
FIG. 19 illustrates an example cell grouping, according to certain embodiments.

FIG. 19 illustrates an example cell grouping scheme 900 that includes a first grouping of cells 902 and a second grouping of cells 904, according to certain embodiments. In the depicted embodiment, the cells are grouped such that there is no cross-over between licensed carriers and unlicensed carriers within each group. Specifically, first grouping of cells 902 includes cells 906A-D on the licensed spectrum, while second grouping of cells 904 includes cells 908A-D on the unlicensed spectrum. In the example embodiment, cell 906A on the licensed spectrum is designated as the PCell for cells 906A-D and 908A-D. Thus, cells 906B-D and 908A-D comprise SCells on the licensed and unlicensed spectrums, respectively.

In certain embodiments, no cross-group UCI may be supported. Thus, where the UCI comprises HARQ feedback for licensed carrier 906A-D, the DL HARQ feedback may only be transmitted on a licensed carrier 906A-D within the cell grouping 902. Such an embodiment is backwards compatible with legacy HARQ feedback mechanisms. Likewise, where the UCI comprises aperiodic CSI reporting for licensed carrier 906A-D, the aperiodic CSI may only be transmitted on a licensed carrier 906A-D within the cell grouping 902, in certain embodiments. This ensures that HARQ feedback and/or aperiodic CSI for licensed carriers 906A-D are sent only on the licensed carriers 906A-D and, thus, ensures the robustness and short latency of UCI transmission for licensed carriers.

Figure 20:
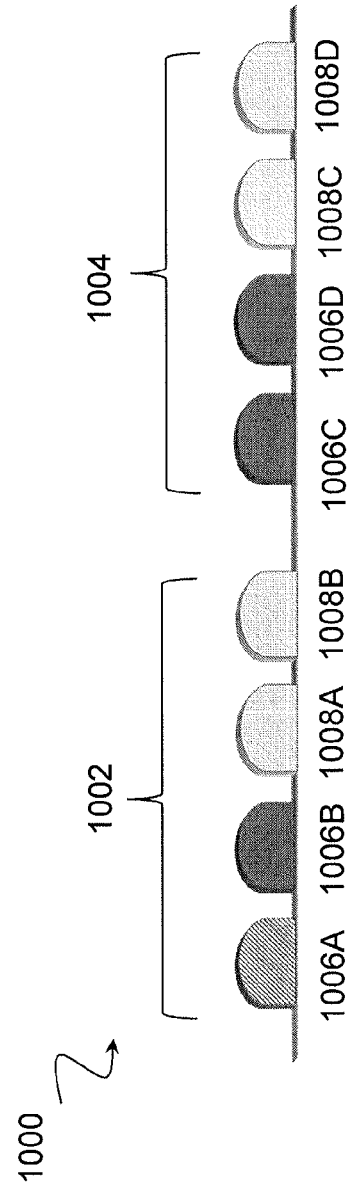
FIG. 20 illustrates an alternative example cell grouping, according to certain embodiments.

FIG. 20 illustrates an alternative example cell grouping scheme 1000 that includes a first grouping of cells 1002 and a second grouping of cells 1004, according to certain embodiments. In the depicted embodiment, the groupings of cells 1002 and 1004 are permitted to have cells including carriers on both the licensed and unlicensed spectrum. For example, first grouping of cells 1002 has cells 1006A and 1006B on the licensed spectrum and cells 1008A and 1008B on the unlicensed spectrum. As another example, second grouping of cells 1004 has cells 1006C and 1006D on the licensed spectrum and cells 1008C and 1008D on the unlicensed spectrum. Licensed carrier 1006A is designated as the PCell for first grouping of cells 1002 and second grouping of cells 1004, and cells 1006B-D and 1008A-D are SCells.

In certain embodiments, no cross-group UCI may be supported. Because each grouping on cells 1002 and 1004 includes at least cell on a licensed carrier, DL HARQ feedback and/or aperiodic CSI, in particular embodiments, may be transmitted on a licensed carrier for each group. Thus, cells 1006A-B may be used to transmit DL HARQ feedback and/or aperiodic CSI for first cell grouping 1002, while cells 1006C-D may be used to transmit DL HARQ feedback and/or aperiodic CSI for second cell grouping 1004.

Figure 21:
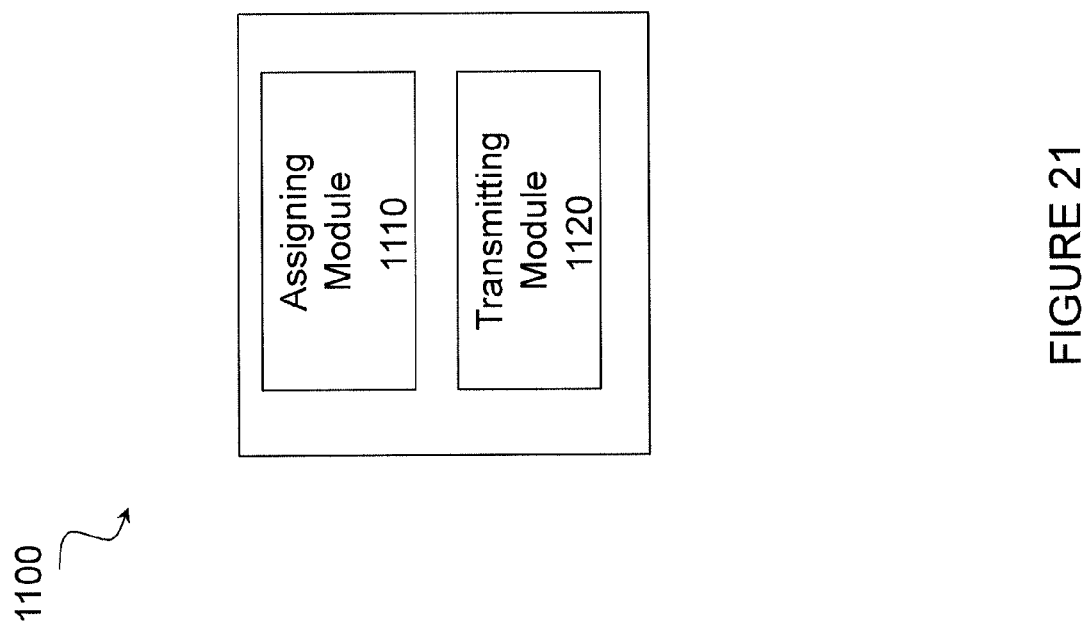
FIG. 21 illustrates an example computer networking virtual apparatus for configuring transmission of UCI on a selected cell, according to certain embodiments.

In certain embodiments, the method for configuring transmission of UCI on a selected cell as described above may be performed by a computer networking virtual apparatus. FIG. 21 illustrates an example computer networking virtual apparatus 1100 for configuring transmission of UCI on a selected cell, according to certain embodiments. In certain embodiments, computer networking virtual apparatus 1100 may include at least one assigning module 1110, at least one transmitting module 1120, and any other suitable modules for configuring transmission of UCI on a selected cell. In certain embodiments, virtual computing device 1100 may alternatively or additionally include modules for performing steps similar to those described above with regard to the method illustrated and described in FIG. 18. In some embodiments, one or more of the modules may be implemented using one or more processors 720 of FIG. 17. The modules may include analog and/or digital circuitry configured to perform the functions disclosed herein. In certain embodiments, the functions of two or more of the various modules may be combined into a single module. Conversely, the functions of one module may, in certain embodiments, be performed by more than one module.

The at least one assigning module 1110 may perform the assigning functions of computer networking virtual apparatus 1100. For example, assigning module 1110 may assign cells to a selected one of a plurality of cell groups. As described above, the cell groups may include licensed cells, unlicensed cells, or some combination of licensed and unlicensed cells.

The transmitting module 1120 may perform the transmitting functions of computer networking virtual apparatus 1100. For example, transmitting module 1120 may a cell selection to a wireless device 110. The cell selection may identify a cell within each of the plurality of cell groups for use in transmitting UCI. In certain embodiments, the cell selection may identify a PCell for transmission of the UCI for all cell groupings. In other embodiments, the cell selection may identify a selected one of the plurality of secondary cells on the unlicensed spectrum for transmission of UCI for at least one grouping of cells. In still other embodiments, the cell selection may identify an SCell on the licensed spectrum for transmission of the UCI for at least one grouping of cells.

Other embodiments of computer networking virtual apparatus 1100 may include additional components beyond those shown in FIG. 21 that may be responsible for providing certain aspects of the radio network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 22:
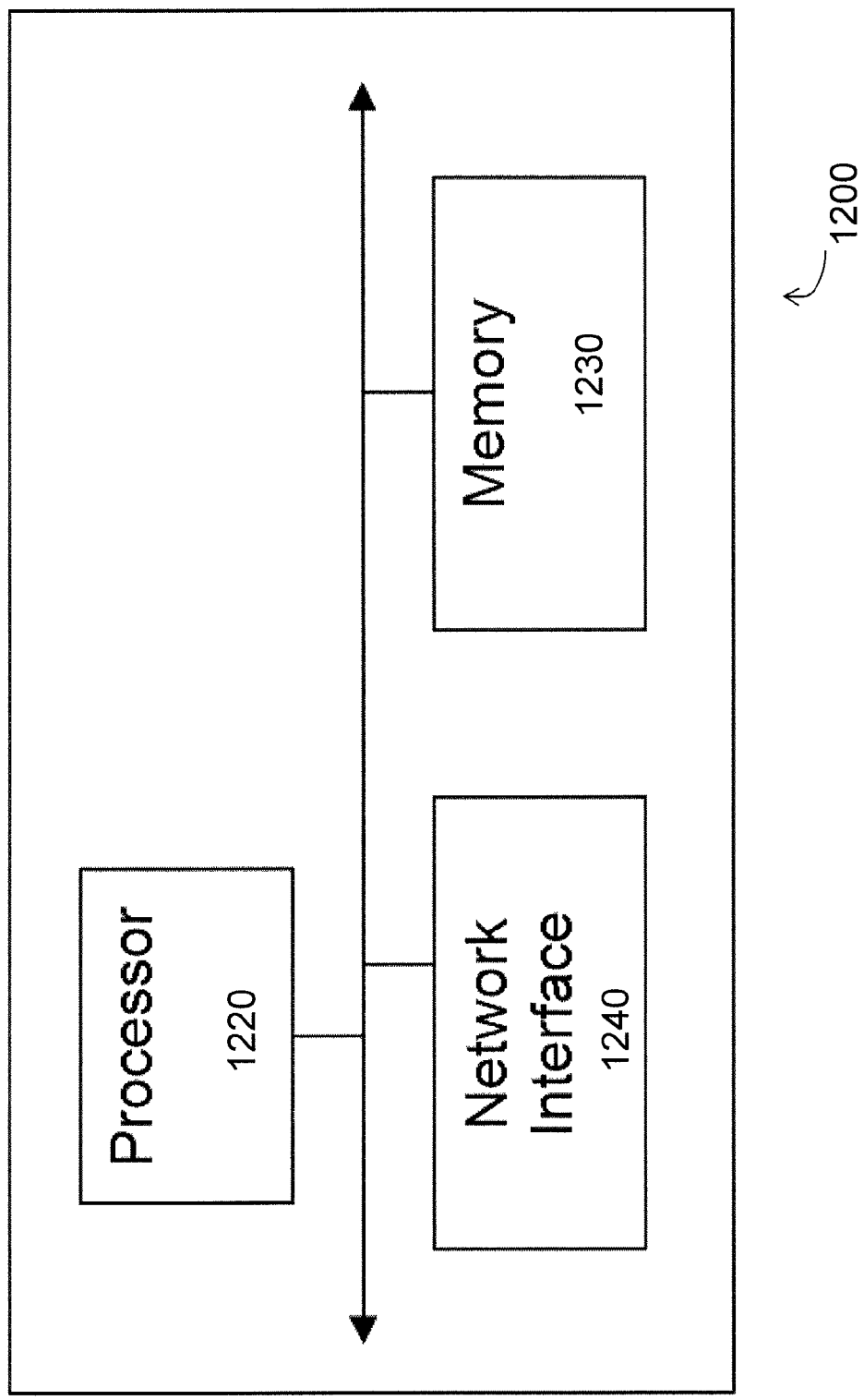
FIG. 22 illustrates an exemplary radio network controller or core network node, in accordance with certain embodiments.

FIG. 22 illustrates an exemplary radio network controller or core network node 1200, in accordance with certain embodiments. Examples of network nodes such as radio network controller or core network node 1200 can include a mobile switching center (MSC), a serving GPRS support node (SGSN), a mobility management entity (MME), a radio network controller (RNC), a base station controller (BSC), and so on. The radio network controller or core network node 1200 may include processor 1220, memory 1230, and network interface 1240. In some embodiments, processor 1220 executes instructions to provide some or all of the functionality described above as being provided by the network node, memory 1230 stores the instructions executed by processor 1220, and network interface 1240 communicates signals to any suitable node, such as a gateway, switch, router, Internet, Public Switched Telephone Network (PSTN), network nodes 115, radio network controllers or core network nodes 1200, etc.

Processor 1220 may include any suitable combination of hardware and software implemented in one or more modules to execute instructions and manipulate data to perform some or all of the described functions of the radio network controller or core network node 1900. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

According to certain embodiments, a method by a wireless device is provided for transmitting uplink control information (UCI) on a serving cell on the unlicensed spectrum. The method includes formatting the UCI as a shortened control signalling transmission and transmitting the UCI formatted as the shortened control signalling transmission to a network node. The shortened control signalling transmission is transmitted during a transmission opportunity on the serving cell on the unlicensed spectrum without performing channel sensing.

According to certain embodiments, a method by a wireless device is provided for transmitting at least one hybrid automatic repeat request (HARQ) acknowledgement on a serving cell on the unlicensed spectrum. The method includes determining, by the wireless device, whether the wireless device has channel access to at least one serving cell on the unlicensed spectrum on which physical uplink shared channel (PUSCH) transmission is scheduled. If the wireless device has channel access to the at least one serving cell on which the PUSCH transmission is scheduled, the at least one HARQ acknowledgement is transmitted on the at least one serving cell multiplexed with scheduled PUSCH data. Conversely, if the wireless device does not have channel access to the at least one serving cell on which the PUSCH transmission is scheduled, the at least one HARQ acknowledgement is formatted in a shortened physical uplink control channel (PUCCH) transmission format, and the at least one HARQ acknowledgement is transmitted in the shortened PUCCH transmission format during a transmission opportunity on at least one serving cell on the unlicensed spectrum without performing channel sensing.

According to certain embodiments, a method by a network node is provided for configuring transmission of uplink control information (UCI) on a selected one of a plurality of cells. The method includes assigning, by the network node, each of the plurality of cells to a selected one of a plurality of cell groups. A cell selection is transmitted to a wireless device. The cell selection identifies a cell within each the plurality of cell groups for use in transmitting the UCI.

According to certain embodiments, a method by a wireless device is provided for transmitting uplink control information (UCI). The method includes performing a carrier sensing procedure. Based on the carrier sensing procedure, it is determined whether the wireless device has channel access on at least one secondary cell (SCell) on the unlicensed spectrum. If the wireless device has channel access to the at least one SCell on the unlicensed spectrum, the UCI is transmitted on the at least one SCell. If the wireless device does not have channel access to the at least one SCell on the unlicensed spectrum, the UCI is scheduled to be transmitted on a cell on the licensed spectrum in a next transmission.

Certain embodiments of the present disclosure may provide one or more technical advantages. For example, certain embodiments may provide good backwards compatibility with legacy UCI mechanisms. Another advantage may be that certain embodiments provide high reliability for UCI for a licensed carrier. Still another advantage may be that certain embodiments provide a greater probability of quick UCI feedback on an unlicensed carrier.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
CCA Clear Channel Assessment
CW Contention Window
DCF Distributed Coordination Function
DIFS DCF Inter-frame Spacing
DL Downlink
DRS Discovery Reference Signal
eNB evolved NodeB, base station
LAA Licensed-Assisted Access
LBT Listen before talk
MRBC Multiple Random Backoff Channels
PDCCH Physical Downlink Control Channel
PIFS PCF Inter-frame Spacing
PUSCH Physical Uplink Shared Channel
QoS Quality of Service
SCell Secondary Cell
SRBC Single Random Backoff Channel
SIFS Short Inter-frame Spacing
TTI Transmission-Time Interval
TXOP Transmission Opportunity
UE User Equipment
UL Uplink Control Information

The invention claimed is:

1. A method by a wireless device for transmitting uplink control information (UCI) on a serving cell on the unlicensed spectrum, the method comprising:
formatting, by the wireless device, the UCI as a shortened control signalling transmission; and
transmitting, by the wireless device, the UCI formatted as the shortened control signalling transmission to a network node,
wherein the shortened control signalling transmission is transmitted during a transmission opportunity on the serving cell on the unlicensed spectrum without performing channel sensing.

2. The method of claim 1, wherein the UCI comprises HARQ acknowledgement.

3. The method of claim 2, wherein the shortened control signalling transmission is a shortened physical uplink control channel (PUCCH) format, the shortened PUCCH transmitted on N OFDM symbols, wherein $0<=N<=7$.

4. The method of claim 1, wherein a duration of the shortened control signalling transmission does not exceed a maximum threshold.

5. The method of claim 4, wherein the maximum threshold is five percent of the transmission opportunity.

6. The method of claim 1, wherein the UCI comprises aperiodic CSI.

7. The method of claim 6, wherein the shortened control signalling transmission is a shortened physical uplink shared channel (PUSCH) format, the shortened PUSCH transmitted on N OFDM symbols, wherein $0<=N<=7$.

8. The method of claim 1, wherein the serving cell comprises a license assisted access SCell on the unlicensed spectrum.

9. A method by a wireless device for transmitting at least one HARQ acknowledgement on a serving cell on the unlicensed spectrum, the method comprising:
determining, by the wireless device, whether the wireless device has channel access to at least one serving cell on the unlicensed spectrum on which physical uplink shared channel (PUSCH) transmission is scheduled;
when the wireless device has channel access to the at least one serving cell on which the PUSCH transmission is scheduled, transmitting, by the wireless device, the at least one HARQ acknowledgement on the at least one serving cell multiplexed with scheduled PUSCH data; and
when the wireless device does not have channel access to the at least one serving cell on which the PUSCH transmission is scheduled,
formatting, by the wireless device, the at least one HARQ acknowledgement in a shortened physical uplink control channel (PUCCH) transmission format; and
transmitting, by the wireless device, the at least one HARQ acknowledgement in the shortened PUCCH transmission format during a transmission opportunity on at least one serving cell on the unlicensed spectrum without performing channel sensing.

10. The method of claim 9, wherein a duration of the shortened PUCCH transmission format does not exceed a maximum threshold.

11. The method of claim 10, wherein the maximum threshold is five percent of the transmission opportunity.

12. The method of claim 9, wherein the serving cell comprises a license assisted access SCell on the unlicensed spectrum.

13. The method of claim 9, further comprising:
determining that the wireless device has access to the uplink carriers on which the PUSCH transmission is scheduled, wherein the PUSCH transmission is allowed to be transmitted on a plurality uplink carriers; and
selecting one of the plurality of uplink carriers for transmission of the UCI, wherein the one of the plurality of uplink carriers is selected from the group consisting of:
a same carrier as the PUCCH transmission is transmitted on;
a carrier with a highest cell index;
a carrier with a lowest cell index; and
a carrier on which an aperiodic CSI report is requested to be transmitted.

14. A method by a network node for configuring transmission of uplink control information (UCI) on a selected one of a plurality of cells, the method comprising:
assigning, by the network node, each of the plurality of cells to a selected one of a plurality of cell groups;
transmitting, by the network node, a cell selection to a wireless device, the cell selection identifying, for each of the plurality of cell groups, a selected cell for use in transmitting the UCI, wherein the cell selection ensures that the transmission of the UCI is made on a spectrum of a particular type, the particular type being either licensed spectrum or unlicensed spectrum.

15. The method of claim 14, wherein:
the plurality of cell groups comprise a first cell group, the first cell group comprising a primary cell and a plurality of secondary cells on the licensed spectrum; and
the cell selection identifies the primary cell within the first cell group for transmission of the UCI.

16. The method of claim 14, wherein:
the plurality of cell groups comprise a first cell group, the first cell group comprising a plurality of secondary cells on the unlicensed spectrum;
the cell selection identifies a selected one of the plurality of secondary cells on the unlicensed spectrum for transmission of the UCI.

17. The method of claim 14, wherein the plurality of cell groups comprise:

a first cell group comprising a primary cell on the licensed spectrum and at least one secondary cell on the unlicensed spectrum; and
the cell selection identifies the primary cell within the first cell group for transmission of the UCI.

18. The method of claim 14, wherein the plurality of cell groups comprise:
a first cell group comprising at least one secondary cell on the licensed spectrum and at least one secondary cell on the unlicensed spectrum; and
the cell selection identifies a secondary cell on the licensed spectrum within the first cell group for transmission of the UCI.

19. The method of claim 14, wherein the UCI comprises HARQ acknowledgment.

20. The method of claim 14, wherein the UCI comprises aperiodic CSI.

21. A method by a wireless device for transmitting uplink control information (UCI), the method comprising:
performing, by the wireless device, a carrier sensing procedure;
based on the carrier sensing procedure, determine determining, by the wireless device, whether the wireless device has channel access on at least one serving cell on the unlicensed spectrum;
when the wireless device has channel access to the at least one serving cell on the unlicensed spectrum, transmitting, by the wireless device, the UCI on the at least one serving cell; and
when the wireless device does not have channel access to the at least one serving cell on the unlicensed spectrum, scheduling, by the wireless device, the UCI to be transmitted on at least one serving cell on the licensed spectrum in a next transmission.

22. The method of claim 21, wherein the UCI comprises aperiodic CSI.

23. The method of claim 21, wherein the UCI comprises a HARQ acknowledgment.

24. The method of claim 21, wherein the at least one serving cell comprises a license assisted access SCell on the unlicensed spectrum.

* * * * *

UNITED STATES PATENT AND TRADEMARK OFFICE
CERTIFICATE OF CORRECTION

PATENT NO. : 10,015,778 B2
APPLICATION NO. : 15/070473
DATED : July 3, 2018
INVENTOR(S) : Yang et al.

Page 1 of 1

It is certified that error appears in the above-identified patent and that said Letters Patent is hereby corrected as shown below:

In the Specification

In Column 2, Line 53, delete "(PDCCH)" and insert -- (PDSCH) --, therefor.

In Column 5, Line 41, delete "(see clause 5.3.1 q))." and insert -- (see clause 5.3.1 q). --, therefor.

In Column 13, Line 49, delete "determining module 610" and insert -- determining module 620 --, therefor.

In Column 14, Line 43, delete "network node 1115" and insert -- network node 115 --, therefor.

In Column 20, Line 4, delete "UL" and insert -- UCI --, therefor.

In the Claims

In Column 22, Line 23, in Claim 21, delete "sensing procedure, determine" and insert -- sensing procedure, --, therefor.

Signed and Sealed this
Eighteenth Day of September, 2018

Andrei Iancu
*Director of the United States Patent and Trademark Office*